(12) United States Patent
Setty et al.

(10) Patent No.: US 10,997,154 B2
(45) Date of Patent: May 4, 2021

(54) VERIFIABLE STATE MACHINES

(71) Applicant: Microsoft Technology Licensing, LLC, Redmond, WA (US)

(72) Inventors: Srinath T. V. Setty, Redmond, WA (US); Sebastian Angel, New York, NY (US); Trinabh Gupta, Santa Barbara, CA (US); Jonathan D. Lee, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 16/150,198

(22) Filed: Oct. 2, 2018

(65) Prior Publication Data

US 2020/0104393 A1    Apr. 2, 2020

(51) Int. Cl.
*G06F 16/23*    (2019.01)
*H04L 9/06*     (2006.01)
*G06F 16/951*   (2019.01)

(52) U.S. Cl.
CPC ........ *G06F 16/2365* (2019.01); *G06F 16/951* (2019.01); *H04L 9/0637* (2013.01); *G06F 16/2379* (2019.01); *H04L 2209/38* (2013.01)

(58) Field of Classification Search
CPC .............. G06F 16/2365; G06F 16/951; G06F 16/2379; H04L 9/0637; H04L 2209/38
See application file for complete search history.

(56) References Cited

U.S. PATENT DOCUMENTS

| | | | |
|---|---|---|---|
| 2017/0230375 A1* | 8/2017 | Kurian | H04L 63/102 |
| 2019/0036887 A1* | 1/2019 | Miller | G06Q 20/06 |
| 2019/0042620 A1* | 2/2019 | Garagiola | G06F 16/2453 |
| 2019/0156332 A1* | 5/2019 | Christidis | H04L 9/14 |

OTHER PUBLICATIONS

Arasu et al., "Concerto: A high concurrency key-value store with integrity," Proceedings of the 2017 ACM International Conference on Management of Data, 2017. (Year: 2017).*

"Hyperledger Fabric", Retrieved From: https://web.archive.org/web/20180529002824/https://hyperledger-fabric.readthedocs.io/en/release-1.0/index.html, Retrieved on: May 29, 2018, 41 Pages.

"International Search Report and Written Opinion Issued in PCT Application No. PCT/US19/049407", dated Oct. 24, 2019, 12 Pages.

(Continued)

*Primary Examiner* — Jay A Morrison (57) ABSTRACT

In one embodiment, a service receives a one or more digests to verify a plurality of requests that were performed by a request handler for one or more clients. The digests summarize processing of the plurality of requests using a first contract. The information for the one or more digests is stored in a plurality of blocks in a distributed ledger. A second contract is executed to verify the processing of the plurality of requests. The second contract generates a first set that stores states for reads of values from the data store; generates a second set that stores states for values written to the data store, and verifies the processing by checking states in the first set are a subset of states in the second set.

20 Claims, 6 Drawing Sheets

(56) References Cited

OTHER PUBLICATIONS

Merkle, Ralph C., "A digital signature based on a conventional encryption function", In Proceedings of the Conference on the Theory and Applications of Cryptographic Techniques on Advances in Cryptology, Aug. 16, 1987, pp. 369-378.

Micali, Silvio, "CS Proofs", In Proceedings of 35th Annual Symposium on Foundations of Computer Science, Nov. 20, 1994, pp. 436-453.

Miers, et al., "Zerocoin: Anonymous distributed e-cash from Bitcoin", In Proceedings of the IEEE Symposium on Security and Privacy, May 19, 2013, 15 Pages.

Moyer, Liz, "Regulators aren't done with 'dark pool' investigations", Retrieved from: https://www.nytimes.com/2016/02/02/business/dealbook/regulators-arent-done-with-dark-pool-investigations.html, Feb. 1, 2016, 2 Pages.

Narula, et al., "zkLedger: Privacy-Preserving Auditing for Distributed Ledgers", In Proceedings of the USENIX Symposium on Networked Systems Design and Implementation, Apr. 9, 2018, 16 Pages.

Papadimitriou, Christos H., "The serializability of concurrent database updates", In Journal of the ACM, vol. 26, Issue 4, Oct. 1979, pp. 631-653.

Parkes, et al., "Achieving trust without disclosure: Dark pools and a role for secrecy-preserving verification", In Proceedings of the Conference on Auctions, Market Mechanisms and Their Applications, Aug. 2015, 11 Pages.

Barno, et al., "Pinocchio: Nearly Practical Verifiable Computation", In IEEE Symposium on Security and Privacy, May 19, 2013, 16 Pages.

Sasson, et al., "Computational integrity with a public random string from quasi-linear PCPs", In Proceedings of In Annual International Conference on the Theory and Applications of Cryptographic Techniques, Apr. 30, 2017, pp. 1-27.

Sasson, et al., "Fast reductions from RAMs to delegatable succinct constraint satisfaction problems", In Proceedings of the 4th conference on Innovations in Theoretical Computer Science, Jan. 9, 2013, pp. 1-101.

Sasson, et al., "Scalable zero knowledge via cycles of elliptic curves", In Proceedings of the International Cryptology Conference, Aug. 17, 2014, pp. 1-47.

Sasson, et al., "Scalable, transparent, and post-quantum secure computational integrity", In Technical Report 2018/046, Mar. 6, 2018, pp. 1-83.

Sasson, et al., "Secure sampling of public parameters for succinct zero knowledge proofs", In Proceedings of the IEEE Symposium on Security and Privacy, May 17, 2015, pp. 287-304.

Sasson, et al., "SNARKs for C : Verifying Program Executions Succinctly and in Zero Knowledge", In Proceedings of be International Cryptology Conference, Oct. 7, 2013, pp. 1-53.

Sasson, et al., "Succinct non-interactive zero knowledge for a von Neumann architecture", In Proceedings of the USENIX Security Symposium, Aug. 20, 2014, pp. 781-796.

Sasson, et al., "Zerocash: Decentralized anonymous payments from Bitcoin", In Proceedings of the IEEE Symposium on Security and Privacy, May 18, 2014, pp. 459-474.

Setty, et al., "Making argument systems for outsourced computation practical (sometimes)", In Proceedings of the Network and Distributed System Security Symposium, Feb. 2012, 20 Pages.

Setty, et al., "Resolving the conflict between generality and plausibility in verified computation", In Proceedings of the ACM European Conference on Computer Systems, Apr. 15, 2013, pp. 1-21.

Setty, et al., "Taking proof-based verified computation a few steps closer to practicality", In Proceedings of the USENIX Security Symposium, Aug. 8, 2012, pp. 1-16.

Setty, et al., "Toward practical and unconditional verification of remote computations.", In Proceedings of the USENIX Workshop on Hot Topics in Operating Systems, May 2011, 5 Pages.

Shallue, et al., "Construction of rational points on elliptic curves over finite fields", In Proceedings of the International Conference on Algorithmic No. Theory, Jul. 23, 2006, 16 Pages.

Tan, et al., "The efficient server audit problem, deduplicated re-execution, and the Web.", In Proceedings of the ACM Symposium on Operating Systems Principles, Oct. 14, 2017, 19 Pages.

Thaler, Justin, "Time-optimal interactive proofs for circuit evaluation", In Proceedings of the International Cryptology Conference, Aug. 18, 2013, 50 Pages.

Thaler, et al., "Verifiable computation with massively parallel interactive proofs.", In Proceedings of the USENIX Workshop on HotTopics in Cloud Computing, Jun. 12, 2012, 6 Pages.

Tu, et al., "Speedy Transactions in Multicore in-memory Databases", In Proceedings of the ACM Twenty-Fourth Symposium on Operating Systems Principles, Nov. 3, 2013, 15 Pages.

Ulas, Maciej, "Rational points on certain hyperelliptic curves over finite fields", In Proceedings of Bulletin of the Polish Academy of Sciences Mathematics, Jul. 2007, 10 Pages.

Vu, et al., "A hybrid architecture for verifiable computation", In Proceedings of the IEEE Symposium on Security and Privacy, May 19, 2013,pp. 223-237.

Wahby, et al., "Doubly-efficient zkSNARKs without trusted setup.", In Proceedings of the IEEE Symposium on Security and Privacy (S&P), 2018, 29 Pages.

Wahby, et al., "Efficient RAM and control flow in verifiable outsourced computation", In Proceedings of the Network and Distributed System Security Symposium, Feb. 10, 2015, 25 Pages.

Wahby, et al., "Full accounting for verifiable outsourcing.", In Proceedings of the ACM Conference on Computer and Communications Security, Oct. 30, 2017, 16 Pages.

Wahby, et al., "Verifiable ASICs", In Proceedings of the IEEE Symposium on Security and Privacy, May 22, 2016, 20 Pages.

Waksman, Abraham, "A permutation network", In Journal of the ACM, vol. 15, No. 1, Jan. 1, 1968, pp. 159-163.

Walfish, et al., "Verifying computations without reexecuting them: From theoretical possibility to near practicality", In Proceedings of Communications of the ACM, vol. 58, No. 2, Feb. 2015, pp. 74-84.

Zhang, et al., "A zero-knowledge version of vSQL", In IACR Cryptology ePrint Archive, Oct. 31, 2017, pp. 1-24.

Zhang, et al., "vRAM: Faster verifiable RAM with program-independent preprocessing", In Proceedings of the IEEE Symposiumon Security and Privacy, May 2018, 18 Pages.

Zhang, et al., "vSQL: Verifying arbitrary SQL queries over dynamic outsourced databases", In Proceedings of the IEEE Symposium on Security and Privacy, May 22, 2017, 18 Pages.

Blumberg, et al., "Verifiable computation using multiple provers", In Proceedings of IACR Cryptology ePrint Archive, Report 2014/846, Oct., 2014, 37 Pages.

Castro, et al., "Practical Byzantine fault tolerance and proactive recovery", In Proceedings of ACM Transactions on Computer Systems, vol. 20, Issue 4, Nov. 1, 2002, pp. 398-461.

Kosba, et al., "Hawk: The Blockchain Model of Cryptography and Privacy-Preserving Smart Contracts", In Proceedings of IEEE Symposium on Security and Privacy, May 1, 2016, pp. 839-858.

Maitin, et al., "Elliptic curve multiset hash", In Journal of the Computer, vol. 60, No. 4, Sep. 8, 2016, pp. 476-490.

Tomescu, et al., "Catena: Efficient non-equivocation via Bitcoin", In Proceedings of 38th IEEE Symposium on Security and Privacy, May 1, 2017, 17 Pages.

Wu, et al., "DIZK: a distributed zero-knowledge proof system", In Proceedings of the USENIX Security Symposium, Aug. 14, 2018, 37 Pages.

Setty, et al., "Proving the correct execution of concurrent services in zero-knowledge" I n Proceedings of 13th USENIX Symposium on Operating Systems Design and Implementation, Oct. 2018, pp. 339-356.

"FINRA Fines Goldman Sachs Execution & Clearing, L.P. $800,000 for Failing to Prevent Trade-Throughs in its Alternative Trading System", Retrieved from: http://www.finra.org/newsroom/2014/finra-fines-goldman-sachs-execution-clearing-lp-800000-failing-prevent-trade-throughs, Jul. 1, 2014, 2 Pages.

"Introducing Sequence", Retrieved from: https://blog.chain.com/introducing-sequence-e14ff70b730, Oct. 23, 2017, 7 Pages.

(56) References Cited

OTHER PUBLICATIONS

Virza, et al., "Libsnark. A C++ library for zkSNARK proofs", Retrieved from: https://github.com/scipr-lab/libsnark, Sep. 2, 2017, 10 Pages.
"Pequin: An end-to-end toolchain for verifiable computation, SNARKs, and probabilistic proofs.", Retrieved from: https://github.com/pepper-project/pequin, Jun. 13, 2018, 2 Pages.
"What is Jubjub?", Retrieved from: https://z.cash/technology/jubjub, Retrieved on: Sep. 25, 2018, 2 Pages.
Albrecht, et al., "MiMC: Efficient encryption and cryptographic hashing with minimal multiplicative complexity", In Proceedings of International Conference on the Theory and Application of Cryptology and Information Security, Dec. 4, 2016, pp. 1-33.
Ames, et al., "Ligero: Lightweight sublinear arguments without a trusted setup", In Proceedings of the ACM Conference on Computer and Communications Security, Oct. 30, 2017, pp. 2087-2104.
Angel, et al., "Verifiable auctions for online ad exchanges", In Proceedings of ACM SIGCOMM, Aug. 12, 2013, 12 Pages.
Arasu, et al., "Concerto: A high concurrency key-value store with integrity", In Proceedings of the ACM International Conference on Management of Data, May 14, 2017, 16 Pages.
Arora, et al., "Proof verification and the hardness of approximation problems", In Journal of the ACM, vol. 45, Issue 3, May 1998, 10 Pages.
Babai, et al., "Checking Computations in Polylogarithmic Time", In Proceedings of the Twenty-Third Annual ACM Symposium on Theory of Computing, May 5, 1991, 16 Pages.
Backes, et al., "ADSNARK: Nearly practical and privacy-preserving proofs on authenticated data", In Proceedings of IEEE Symposium on Security and Privacy, May 17, 2015, 44 Pages.
Barker, et al., "Transitions: Validation of Transitioning Cryptographic Algorithm and Key Lengths", In Special Publication of NIST 800-131 B, Feb. 2011, 11 Pages.
Bellare, et al., "A new paradigm for collision-free hashing: Incrementality at reduced cost", In International Conference on the Theory and Applications of Cryptographic Techniques, May 11, 1997, pp. 163-192.
Beneš, V. E., "Mathematical theory of connecting networks and telephone traffic", In Publication of Academic Press, Jan. 1, 1965.
Bernstein, et al., "Elligator: elliptic-curve points indistinguishable from uniform random strings", In Proceedings of be ACM Conference on Computer and Communications Security, Nov. 4, 2013, 13 Pages.
Bernstein, et al., "Formal aspects of serializability in database concurrency control", In Journal of IEEE Transactions on Software Engineering, vol. 5 Issue 3, May 1979, pp. 203-216.
Bernstein, et al., "Twisted edwards curves", In Proceedings of International Conference on Cryptology in Africa, Jun. 11, 2008, pp. 1-17.
Bitansky, et al., "Recursive Composition and Bootstrapping for SNARKs and Proof-Carrying Data", In Proceedings of the ACM Symposium on Theory of Computing, Jun. 1, 2013, pp. 111-120.
Bitansky, et al., "Succinct non-interactive arguments via linear interactive proofs", In Proceedings of the 10th theory of cryptography conference on Theory of Cryptography, Mar. 3, 2013, 19 Pages.
Blum, et al., "Checking the Correctness of Memories", In Proceedings of the 32nd Annual Symposium of Foundations of Computer Science, Oct. 1, 1991, pp. 90-99.
Bootle, et al., "Efficient zero-knowledge arguments for arithmetic circuits in the discrete log setting", In Proceedings of the 35th Annual International Conference on Advances in Cryptology, May 8, 2016, pp. 1-37.
Braun, et al., "Verifying computations with state", In Proceedings of the Twenty-Fourth ACM Symposium on Operating Systems Principles, Nov. 3, 2013, pp. 1-16.
Braun, et al., "Verifying computations with state (extended version)", In Report of Cryptology ePrint Archive, Sep. 2018, 42 Pages.
Bunz, et al., "Bulletproofs: Short proofs for confidential transactions and more", In Proceedings of the IEEE Symposium on Security and Privacy, May 2018, pp. 1-45.
Cecchetti, et al., "Solidus: Confidential distributed ledger transactions via PVORM", In Proceedings of the ACM SIGSAC Conference on Computer and Communications Security, Oct. 30, 2017, pp. 1-23.
Chase, et al., "ZSL Proof of Concept", Retrieved from: https://github.com/jpmorganchase/quorum/wiki/ZSL, Retrieved on: Sep. 25, 2018, 7 Pages.
Chiesa, et al., "Cluster computing in zero knowledge", In Proceedings of the International Conference on the Theory and Applications of Cryptographic Techniques, Apr. 26, 2015, pp. 1-30.
Clarke, et al., "Incremental multiset hash functions and their application to memory integrity checking", In Proceedings of the International conference on the theory and application of cryptology and information security, Nov. 30, 2003, 20 Pages.
Cormode, et al., "Practical verified computation with streaming interactive proofs", In Proceedings of the 3rd Innovations in Theoretical Computer Science Conference, Jan. 8, 2012, 23 Pages.
Costello, et al., "Geppetto: Versatile verifiable computation", In Proceedings of the IEEE Symposium on Security and Privacy, May 17, 2015, pp. 253-270.
Dwork, et al., "How efficient can memory checking be?", In Theory of Cryptography Conference, Mar. 15, 2009, pp. 1-21.
Farashahi, et al., "Indifferentiable deterministic hashing to elliptic and hyperelliptic curves", In Proceedings of Mathematics of Computation, vol. 82, Issue 281, Jan. 2013, 18 Pages.
Fiore, et al., "Flash first, argue later: Adaptive verifiable computations on outsourced data", In Proceedings of the ACM SIGSAC Conference on Computer and Communications Security, Oct. 24, 2016, pp. 1-40.
Fu, et al., "Fast and secure distributed read-only file system", In Proceedings of the USENIX Symposium on Operating Systems Design and Implementation, Oct. 22, 2000, pp. 1-16.
Gennaro, et al., "Quadratic span programs and succinct NIZKs without PCPs", In Proceedings of Annual International Conference on the Theory and Applications of Cryptographic Techniques, May 26, 2013, pp. 1-59.
Ghemawat, et al., "LevelDB: a fast and lightweight key/value database library by Google", Retrieved from: https://github.com/google/leveldb, Jan. 1, 2015, 4 Pages.
Goldreich, et al., "How to construct random functions", In Journal of the ACM, vol. 33 Issue 4, Oct. 4, 1986, pp. 792-807.
Goldwasser, et al., "Delegating Computation: Interactive Proofs for Muggles", In Proceedings of the fortieth Annual ACM Symposium on Theory of Computing, May 17, 2008, 10 Pages.
Goldwasser, et al., "The Knowledge Complexity of Interactive Proof-Systems", In Proceedings of the Seventeenth Annual ACM Symposium on Theory of Computing, May 6, 1985, pp. 291-304.
Groth, Jens, "On the size of pairing-based non-interactive arguments", In Proceedings of Annual International conference on the Theory and Applications of Cryptographic Techniques, May 8, 2016, 25 Pages.
Herlihy, et al., "Linearizability: A Correctness Condition for Concurrent Objects", In Journal of ACM Transactions on Programming Languages and Systems, vol. 12, Issue 3, Jul. 1990, pp. 463-492.
Icart, Thomas, "How to hash into elliptic curves", In Proceedings of Annual International Cryptology Conference, Aug. 16, 2009, pp. 1-14.
Ishai, et al., "Efficient arguments without short PCPs", In Proceedings of Twenty-Second Annual IEEE Conference on computational Complexity, Jun. 13, 2007, pp. 1-22.
Klian, Joe, "A note on efficient zero-knowledge proofs and arguments (extended abstract)", In Proceedings of the twenty-fourth annual ACM symposium on Theory of computing, May 4, 1992, pp. 723-732.
Kosba, et al., "C∅C∅: A Framework for Building Composable Zero-Knowledge Proofs", In Report of Cryptology ePrint Archive, Retrieved on: Sep. 29, 2018, pp. 1-53.
Kosba, et al., "TRUESET: Faster verifiable set computations", In Proceedings of the USENIX Security Symposium,, Aug. 20, 2014, pp. 1-30.

(56) References Cited

OTHER PUBLICATIONS

Kosba, et al., "xJsnark: A framework for efficient verifiable computation", In Proceedings of the IEEE Symposium on Security and Privacy, May 20, 2018, 22 Pages.

Li, et al., "Secure untrusted data repository (SUNDR)", In Proceedings of the USENIX Symposium on Operating Systems Design and Implementation, Dec. 6, 2004, pp. 121-136.

Lamport, Leslie, "Time, clocks, and the ordering of events in a distributed system", In Proceedings of Communications of the ACM, vol. 21, Issue 7, Jul. 1978, pp. 558-565.

* cited by examiner

|  | insert(k) | get(k)/put(k) | get(k)/put(k) | get(k)/put(k) |
|---|---|---|---|---|
| Read set |  | {k,0,1} | {k,1,2} | {k,5,3} |
| Write set | {k,0,1} | {k,1,2} | {k,5,3} | {k,6,4} |
| Time stamp | ts=1 | ts=2 | ts=3 | ts=4 |

FIG. 4A

|  | insert(k) | get(k)/put(k) | get(k)/put(k) | get(k)/put(k) |
|---|---|---|---|---|
| Read set |  | {k,0,1} | {k,1,2} | {k,6,3} |
| Write set | {k,0,1} | {k,1,2} | {k,5,3} | {k,6,4} |
| Time stamp | ts=1 | ts=2 | ts=3 | ts=4 |

VERIFIABLE STATE MACHINES

BACKGROUND

A verifiable state machine (VSM) is similar to a traditional state machine (e.g., a request processing service) except that the verifiable state machine produces succinct correctness proofs of its state transitions (e.g., request executions). A verifier can check the proofs without re-executing the state transitions and without access to the plain text content of the request, responses, or the internal state of the verifiable state machine.

The verifiable state machine may offer verification without reexecuting the requests, but the costs of using a verifiable state machine may be prohibitive. For example, the state representations may be stored in a log that needs to be traversed backwards to determine all the operations that were performed. Then, a verifier can verify the states. The traversing of the log increases the cost to verify the operations as the number of transactions increase. These limitations may limit the applications of verifiable state machines in different target applications.

BRIEF DESCRIPTION OF THE DRAWINGS

In one embodiment, a computer system includes a processor and a computer readable storage medium having stored thereon program code. The program code, when executed by the processor, causes the processor to receive a one or more digests at a service configured to verify a plurality of requests that were performed by a request handler for one or more clients. The one or more digests summarize processing of the plurality of requests using a first contract. Information is stored for the one or more digests in a plurality of blocks in a distributed ledger. A second contract is executed to verify the processing of the plurality of requests. The second contract generates a first set that stores states for reads of values from the data store, generates a second set that stores states for values written to the data store, and verifies the processing by checking states in the first set are a subset of states in the second set.

DETAILED DESCRIPTION

A request handler operates as a verifiable state machine that maintains state in a data store. The request handler can receive requests from clients, retrieve the state from the data store for the request, and then perform an operation on the state to process the request and produce a response. The request handler can then return the response to the client. The request handler then writes an updated state to the data store reflecting the processing of the request.

The request handler also sends a digest for the operation to a verifier, which can verify the operation of the request handler. In the verification, the verifier uses sets that are generated from the digest and any previously received digests for other operations. For example, a read set summarizes the states that are read from the data store. Also, a write set summarizes the states written to the data store. The verifier can verify the correctness of the operations by determining if the states in the read set are a subset of the states in the write set. When the states in the read set are a subset of the states in the write set, then the verifier can verify that the operations performed are valid. However, if the states in the read set are not a subset of the states in the write set, the verifier determines that the operations that were performed are not valid.

The use of the sets improves the verification because the cost to perform the verification does not significantly increase as the number of states stored in the data store increases. Compared to an append only log that appends read and write requests in the same log, the use of sets allows the verification to be performed using a single check on the two sets. This does not require traversing of a single log of the operations each time a verification is performed.

System Overview

Figure 1:
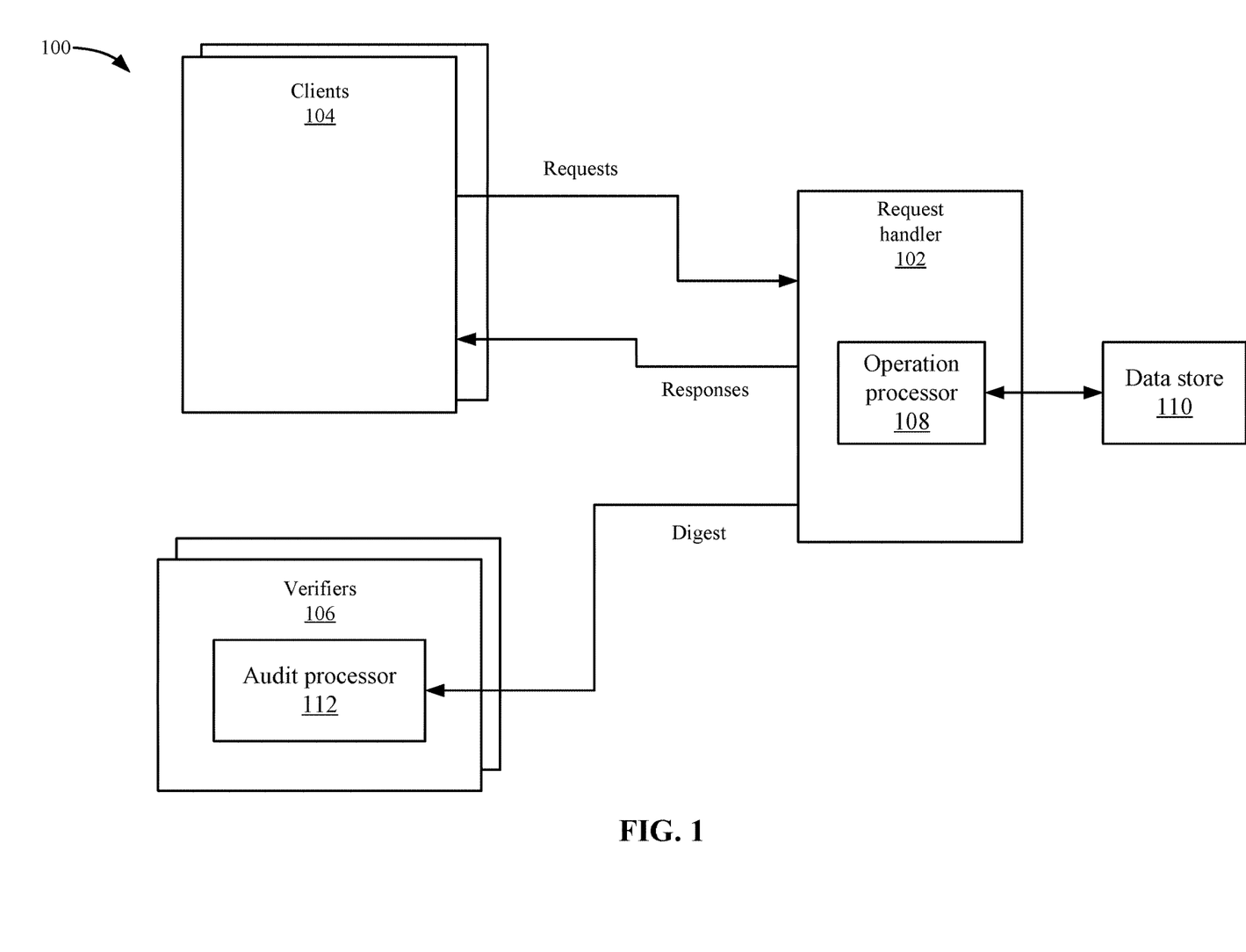
FIG. 1 depicts a simplified system of a verifiable state machine according to some embodiments.

FIG. 1 depicts a simplified system 100 of a verifiable state machine according to some embodiments. Clients 104 may be devices that send requests and receive responses.

A request handler 102 may process the requests and generate responses. Request handler 102 may include a verifiable state machine that can process the requests. An operation processor 108 in request handler 102 may receive a request and use a state from a data store 110 to process the request. Upon processing the request, operation processor 108 may produce a response that can be sent back to client 104.

Data store 110 may store the states using a key value store. For example, a state may include a key and a value, where the key may be used to look up the value in the key value store. For example, operation processor 108 retrieves the last stored value for the key using a get operation and then uses the value in processing the request. Then, operation processor 108 stores the updated state for the key in the key value store using a put operation. For example, if the value changes, operation processor 108 stores the updated value in association with the key. Also, if the value does not change, operation processor 108 stores the same value in association with the key.

Request handler 102 may also send a digest to verifiers 106 based on processing the request. Verifiers 106 may be separate from clients 104, or in other embodiments, may be part of clients 104. The digest includes information on the operations that were performed to process the requests and generate responses. For example, the digest sent to verifier 106 may include information that represents the retrieved state and inserted state. As will be described in more detail below, verifier 106 may not be able to determine the exact state that is stored in data store 110 from the digest or the operations that were performed, but may use the information to verify the operations performed by request handler 102.

Data store 110 is a key-value store for request handler 102, which may be outsourced to an untrusted server while verifiers 106 can verify the correctness of the interactions between request handler 102 and data store 110. Specifically, request handler 102 receives operations from clients 104 and executes them on data store 110 in a way that verifiers 106 can check that all operations respect linearizable semantics: a get on a key returns the value written by the most recent put to that key.

In the verification, an audit processor 112 may maintain a read set that stores states that have been read from data store 110. Also, audit processor 112 maintains a write set that stores states that have been written to data store 110. When audit processor 112 receives a digest for an operation, audit processor 112 may generate a state for the read set and/or a state for the write set, which are appended to existing states in the read set and the write set. Audit processor 112 can then verify the operations of request handler 102 by comparing the read set and the write set. For example, if the states in the read set are at least a subset of the states in the write set, then audit processor 112 determines that the operations performed by request handler 102 are valid. However, if the states in the read set are not a subset of the states in the write set, audit processor 112 determines that the operations performed by request handler 102 are not valid. The use of the set comparison is a more efficient comparison because the sets can be compared faster than having to traverse each state in a log. For example, if a sequential log is used, the entire log needs to be traversed to determine if values match. If the states were a totally ordered log where the log records all key-value operations that are issued to the data store along with the responses supplied by data store, the verifier can execute the following audit procedure: for each get on a key k recorded in the log, identify the most recent put to k (by traversing the log backwards starting from the point at which the get is recorded) and check if the value returned by the get matches the value written by the put. If all the checks pass, the verifier outputs the operations were verified. There are two issues with this method: (1) The state becomes large since the size of the log is proportional to the number of key-value store operations, and the state grows indefinitely; and (2) the cost to verify the correctness of each get operation is linear to the size of the log. However, using the sets, logic can be used to determine whether or not the read set is a subset of the write set. The use of sets lowers verification cost by relying on a single check of two sets instead of an append-only log, and it reduces the size of the state maintained by verifier by leveraging a hash function that operates on sets. As will be discussed below, the hash function may be used to reduce the amount of data used in the comparison of the sets. The check may not identify which operation was executed incorrectly unlike the log based check, but the verification cost is significantly reduced because a log does not need to be traversed.

Operation Processing

Instead of a totally-ordered log, some embodiments use a timestamp counter ts along with the read set and the write set. The verification still the return value of each get operation using a single check on these two sets. Data store 110 may be structured such that each entry is the state of (k, v, ts), where k is a key, v is the associated value, and ts is a timestamp that indicates the last time the key was read (or updated). Verifier 106 initializes the read set and the write set to empty and the timestamp ts to 0. When a new key-value pair (k, v) is inserted into data store 110, request handler 102 (or another entity) increments the local timestamp ts, adds the tuple (k, v, ts) into data store 110, and sends this tuple to verifier 106 in a digest. Similarly, when request handler 102 wishes to execute a get (or a put) operation on an existing key k, request handler 102 receives the tuple (k, v, ts), performs some operation to generate a new value v', updates the timestamp (e.g., increments the timestamp by 1), and adds the new tuple (k, v', ts+1). The tuple (k, v, ts) is added to the read set and the tuple (k, v', ts+1) is added to the write set. The following describes the general method for performing the operations.

Figure 2:
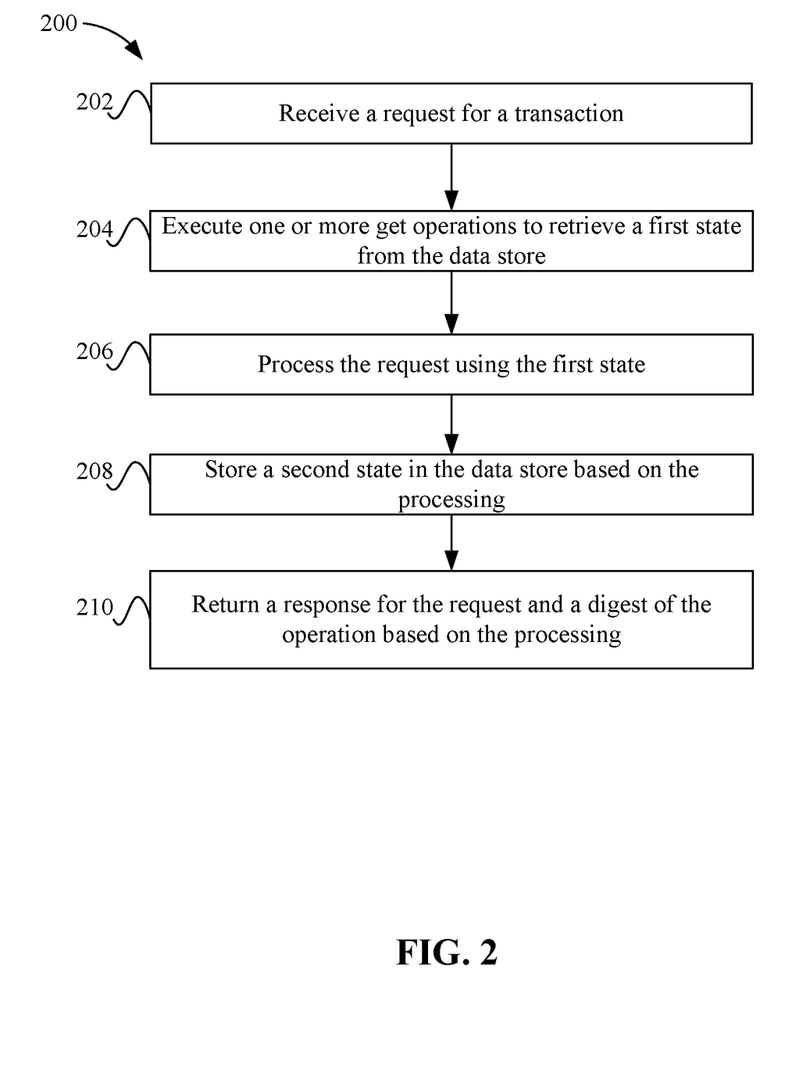
FIG. 2 depicts a simplified flowchart of a method for performing operations for requests according to some embodiments.

FIG. 2 depicts a simplified flowchart 200 of a method for performing operations for requests according to some embodiments. At 202, operation processor 108 receives a request for a transaction. For example, client 104 may send a request. Various applications could be used that send requests and will be discussed in more detail below. In some embodiments, the request includes a computation $\Psi$, digest number d, and a transaction number x. The computation $\Psi$ expressed in a high-level language (e.g., C, Java) and transformed to a set of algebraic constraints $C_\Psi$. An algebraic constraint is an equation in which each summand is either a constant, a variable, or a product of two variables. Variables take values from a finite field $F_p$ over a large prime p (i.e., $\{0, \ldots, p-1\}$).

Then, operating processor 108 uses the computation $\Psi$ to retrieve state from data store 110. For example, at 204, operation processor 108 executes one or more get operations to retrieve a first state from data store 110. Previously, operation processor 108 may have inserted a state in the key value store for a key. The get operation may retrieve the state using the key, which may be determined from the computation $\Psi$.

At 206, operation processor 108 processes the transaction using the first state. For example, operation processor 108 applies the state to the computation to produce a response. Then, at 208, operation processor 108 uses a put operation to store a second state for the key in the data store based on the processing. For example, the second state may be stored using the same key that was used to retrieve the first state. The second state may be different from the first state, or may be the same if the state is not changed. For example, a second value is stored for the key in the key value data store.

Then, at 210, operation processor 108 returns the response from the transaction and a digest of the operation based on the processing. The digest may include information that can be used by audit processor 112 to verify the operation that was performed (and any previous operations). In some embodiments, the digest returned by the last operation on a state (di) is sent to verifier 106 along with the output of request execution (yi) and a proof ($\pi_i$). This proof establishes that the output $y_i$ is obtained by applying the computation $\Psi_{req}$ on the input $x_i$, and that the digest was updated correctly. However, the proof $\pi_i$ assumes that the underlying state operations were correct (e.g., the values returned by the get operation); verifying the validity of this assumption is the purpose of the verification $\Psi_{audit}$. Audit processor 112 can verify the proof along with proofs of prior requests to obtain an end-to-end guarantee of correct execution for all k requests as will be described below.

Audit Processing

Data store 110 may be an un-trusted data store such that the verification of the operations needs to be performed. The verification may verify that a get operation on a key returns the value written by a most recent get operation on that key. Every element verifier 106 added to the read set and write set is unique because the timestamp ts is incremented after each operation, and the read set "trails" the write set by exactly the last write to each key (e.g., RS⊆WS). This leads to an efficient audit procedure: verifier 106 can receive (or request) the current state of data store 110 (e.g., the set of key, value, and timestamp tuples) (denote this returned set as M), and check if:

RSUM=WS.

Figure 3:
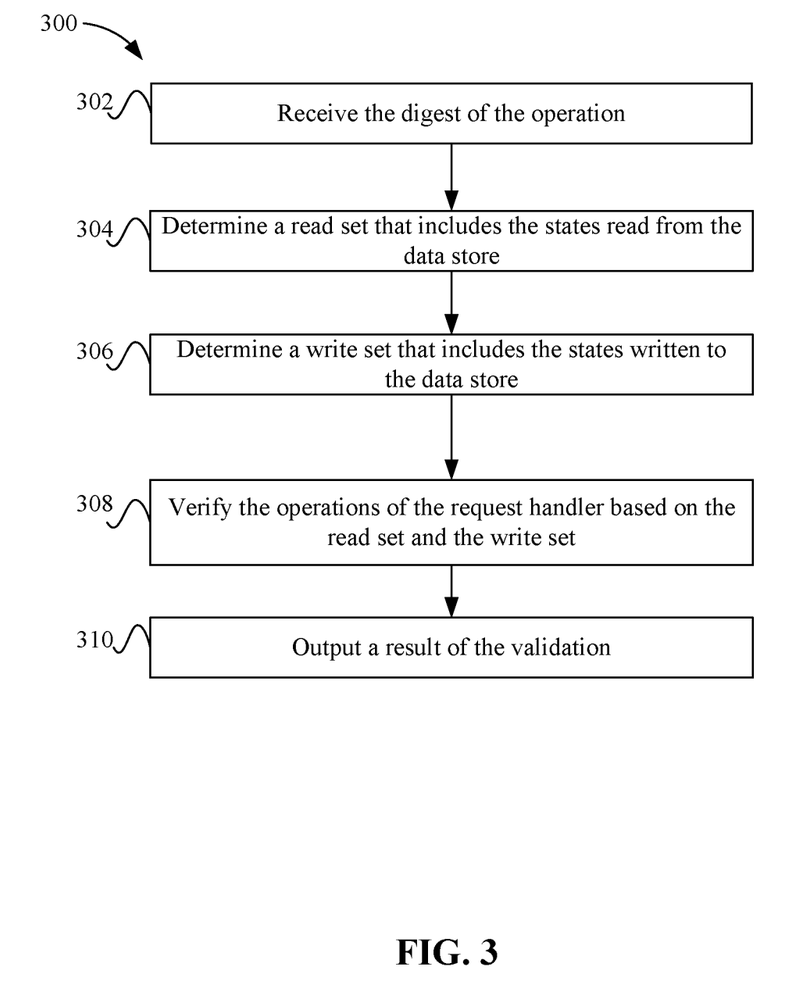
FIG. 3 depicts a simplified flowchart of a method for verifying the operations of a request handler according to some embodiments.

The above check determines that the read set is a subset of the write set. Although other methods for checking if the read set is a subset of the write set exist, the above takes the union of the read set and the current state and then determines if the result is equal the write set. If the read set included an invalid value that was read from the state of the last get operation, then the above check would fail. The union of the current state may capture the state of the latest write operation or an insert operation that may not be included in the read set. FIG. 3 depicts a simplified flowchart 300 of a method for verifying the operations of request handler 102 according to some embodiments. At 302, audit processor 112 receives a digest of the operation. In some embodiments, the digest may not include the plain text of the details of the operation, such as the state in data store 110. Rather, masking (e.g., a commitment) may be used such that audit processor 112 does not know the exact state, but can verify the operations using the digest. In some embodiments, the digest may include the state from the latest operation performed. Audit processor 112 can add the digest to other digests that may include the state for all of the operations that have been performed.

At 304, audit processor 112 determines a read set that includes the states read from data store 110. The read set may be include a set of information, such as a tuple that stores the key, a value that was read, and a timestamp. The read set may include all the states read for one or more keys from data store 110.

At 306, audit processor 112 determines a write set that includes the states written to data store 110. The write set may be include a similar set of information as the read set, such as a tuple that stores the key, a value that was written, and a timestamp. Also, the write set may include all the states written for one or more keys to data store 110. The timestamp may increase for every request performed, so a get operation to a key and a put operation to a key will have a different timestamp. This ensures that the state for the get operation and the write operation are different even though a same value is retrieved and written to the key.

At 308, audit processor 112 validates the operation of request handler 102 based on the read set and the write set. In some embodiments, a comparison of the states in the read set and the write set is used to determine if the operation of request handler 102 is valid. As mentioned above, audit processor 112 determines if the states in the read set for a key is a subset of the states for a write set for the key. Audit processor 112 may perform the comparison for all keys.

At 310, audit processor 112 outputs a result of the validation. For example, the result may indicate whether or not the validation was valid or not valid.

Figure 4A:
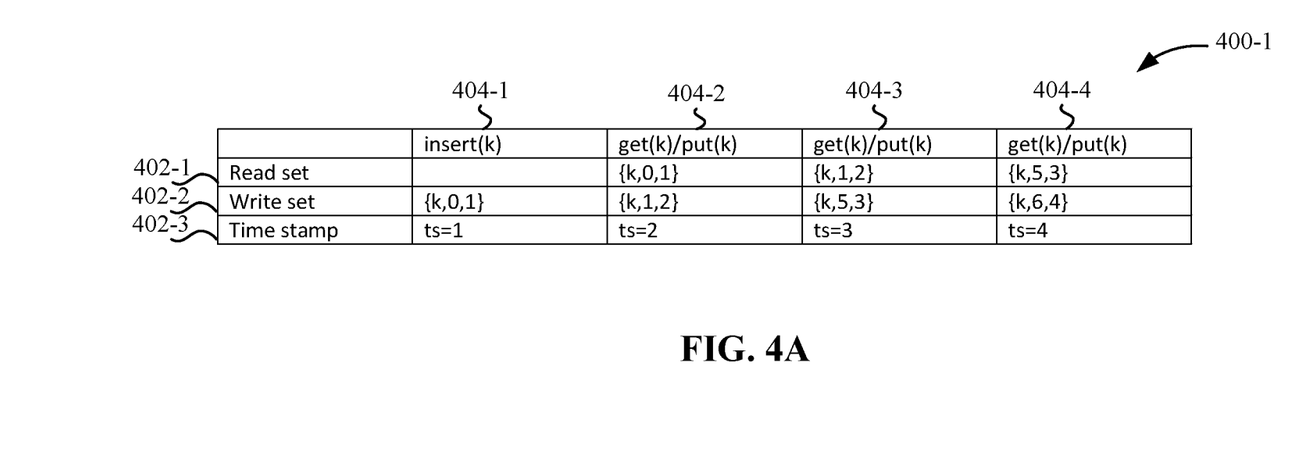
FIG. 4A depicts an example of table that contains state that is valid according to some embodiments.
Figure 4B:
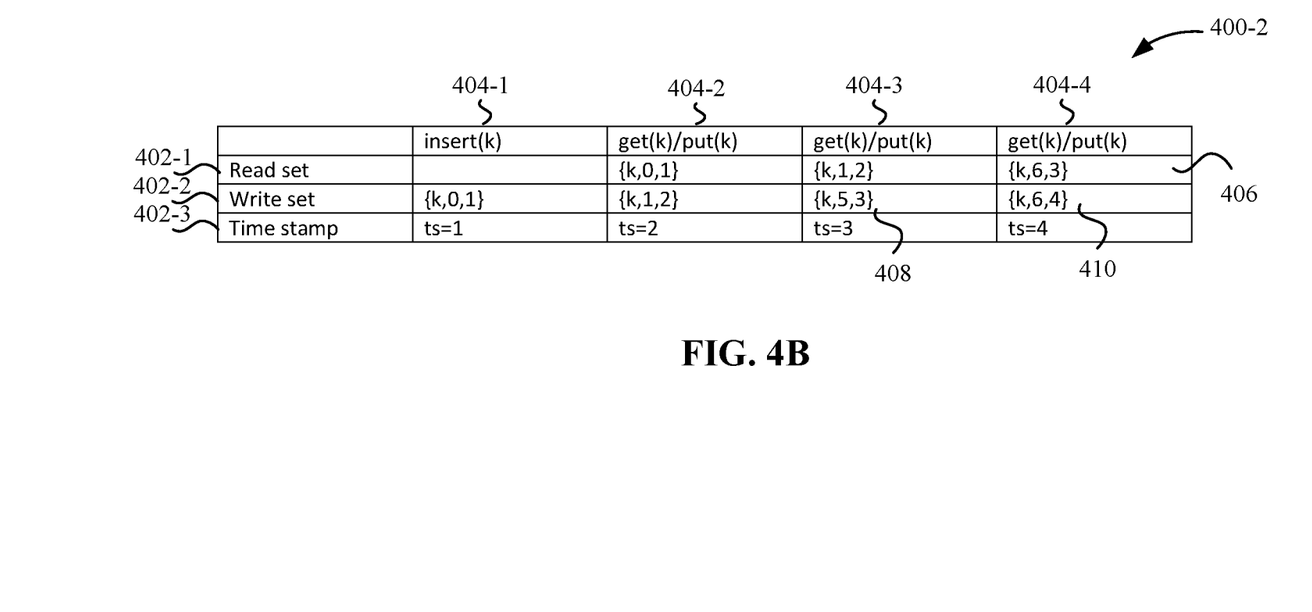
FIG. 4B depicts an example of a table that contains state that is not valid according to some embodiments.

FIGS. 4A and 4B depict examples of verifying the operations using the read set and the write set according to some embodiments. FIG. 4A depicts an example of table 400-1 that contains state that is valid according to some embodiments. A table is used to illustrate the validation, but may not be used in an implementation. Table 400-1 includes a row 402-1 that summarizes the states in a read set; a row 402-2 that summarizes the states in a write set; and a row 402-3 that includes a timestamp. As discussed above, audit processor 112 receives information for the operations performed and can generate the states for the read set and the write set. Table 400-1 also includes columns 404-1 to 404-4 that summarize operations that were performed and the resulting read set and write set. At 404-1, a state {k,0,1} is inserted into the write set. The information is stored in a tuple of a key k, a value v, and a timestamp t (e.g., {k, v, ts}). The state indicates that the value of 0 was inserted for a key k at a timestamp of 1. The timestamp ts=1 may be a transaction number, which may be incremented by 1 for each operation that is performed. The timestamp may also be implemented in other ways, such as recording the current time.

After performing the insert operation, request handler 102 performs a get operation for the key k, which returns the value of "0". The state for this operation corresponds to {k,0,1}. This is the same state that was inserted for the key k. Operation processor 108 can then process the value for a request. The processing may update the value for the key and operation processor 108 may use a put operation to write an updated value for the key k. In this example, the updated state is {k,1,2}, which represents that the value is now equal to 1 and the timestamp is equal to ts=2. Audit processor 112 may increment the timestamp due to the get request being performed.

A second get operation for the key k returns the value of "1". Audit processor 112 generates the state {k,1,2} for the read set, which is the same as the previous state generated for the key k. The timestamp is the same since the state is being retrieved. After performing some operation, operation processor 108 inserts the updated value of "5" for the key k. Audit processor 112 generates a new state {k,5,3} for the write set, which represents a new value of 5 and a timestamp of ts=3.

Operation processor 108 performs a get operation for key k that retrieves the value of "5". Audit processor 112 generates the state of {k,5,3}, which is the same as the previous state generated for the key k. Audit processor 112 may perform an audit at this point. In this example, audit processor 112 determines if the states in the read set are at least a subset of the states in the write set. At least a subset may mean that the states included in the read set are all included in the write set without any states in the read set not being included in the write set. In this example, each state in the read set is equal to each value in the write set. That is, a subsequent get operation retrieves the same value as was stored by a previous put operation for a key k. Accordingly, audit processor 112 verifies that the operations performed by operation processor 108 are valid.

In addition to performing the audit after the get operation, audit processor 112 may perform the audit after a put operation is performed. For example, operation processor 108 may write a value of "6" for key k using a put operation. Audit processor 112 generates a state of {k,6,4} for the put operation. The timestamp is incremented again after the last get operation. Now, the write set includes a state that is not found in the read set. However, because audit processor 112 may determine if the read set includes states that are a subset of the write set, the fact that the write set includes an extra state does not make the verification invalid. Rather, all the sets in the read set are all included in the write set (e.g., the read set is a subset of the write set). In other words, the read set does not include a state that is not included in the write set. Accordingly, audit processor 112 verifies that the operations are valid.

FIG. 4B depicts an example of table 400-2 that contains state that is not valid according to some embodiments. The states found in columns 404-1, 404-2, and 404-3 are the same as the states shown in table 400-1 of FIG. 4A. However, at 406, a state generated from a get(k) operation is {k,6,3}. As can be seen, this state {k,6,3} is different from the state {k,5,3} that was stored by the last put operation for the key previously as shown at 408. In this example, a get operation for key k may have returned the value "6" instead of "5". The above use of retrieving the current state of data store 110 and taking the union of the read set and the current state and determining if the result is equal to the write set could be used. For discussion purposes, the verification of the read set and the write set will be discussed using the contents of the read set and the write set. If audit processor 112 performs the validation after the get(k) operation, the read set includes a state {k,6,3}, which is not included in the write set. Accordingly, audit processor 112 determines that the operation performed by operation processor 108 was not valid because the read set is not a subset of the write set (e.g., all the states in the read set are included in (e.g., not equal to) the states in the write set).

Also, if audit processor 112 performs the validation after a put(k) operation, at 410, the state {k,6,4} is included in the write set. In this case, a write operation may have written the value of "6" for the key. The value written for the key is the same as the value read from the key (e.g., 6). However, the state at 410 in the write set would not equal the state at 406 because the timestamp is increased when a value is retrieved by the get(k) operation. For example, the timestamp is increased from three to four. Accordingly, audit processor 112 also determines that the operation is not valid in this case because the read set is not a subset of the write set. Audit processor 112 may perform the above analysis for all the keys k that are included in the digests.

In the above, verifier 106 may generate the state, but the state may be generated in other ways. In other embodiments, verifier 106 may send the state to request handler 102, which may store the state. For verification, verifier 106 may retrieve the current state (e.g., the tuples) from request handler 102.

Applications

The verifiable state machine described above may be used in different applications according to some embodiments. In some embodiments, the applications may require zero knowledge and succinctness. Succinctness means the sizes of requests and responses are constant. Also, the digest is zero-knowledge because the requests and responses do not appear in plaintext and the internal operations cannot be determined by the verifier. To make the digest succinct and zero-knowledge, request handler 102 that takes as input (or produces as output) commitments to requests, responses, and the state. For example, a client 104 sends a request to request handler 102, such as in plain text. Request handler 102 performs the operation (without commitments) and sends back to the client 104 the output. Then, request handler 102 generates a proof $\pi_i$ for verifier 106. Specifically, request handler 102 generates a commitment to the request, and uses it to solve the constraint set produced by the computation $\Psi_{req}$. Request handler 102 then adds the commitments of the request, response, and state, and the corresponding proof $\pi_i$ to the digest. Verifier 106 uses these commitments to verify the proofs without learning anything about the requests, responses, or states beyond their correctness. Furthermore, since the size of each commitment and proof is constant, it satisfies the succinctness property. The above characteristics make it possible to incorporate the verifiable state machine into applications that require zero knowledge and succinctness.

Figure 5:
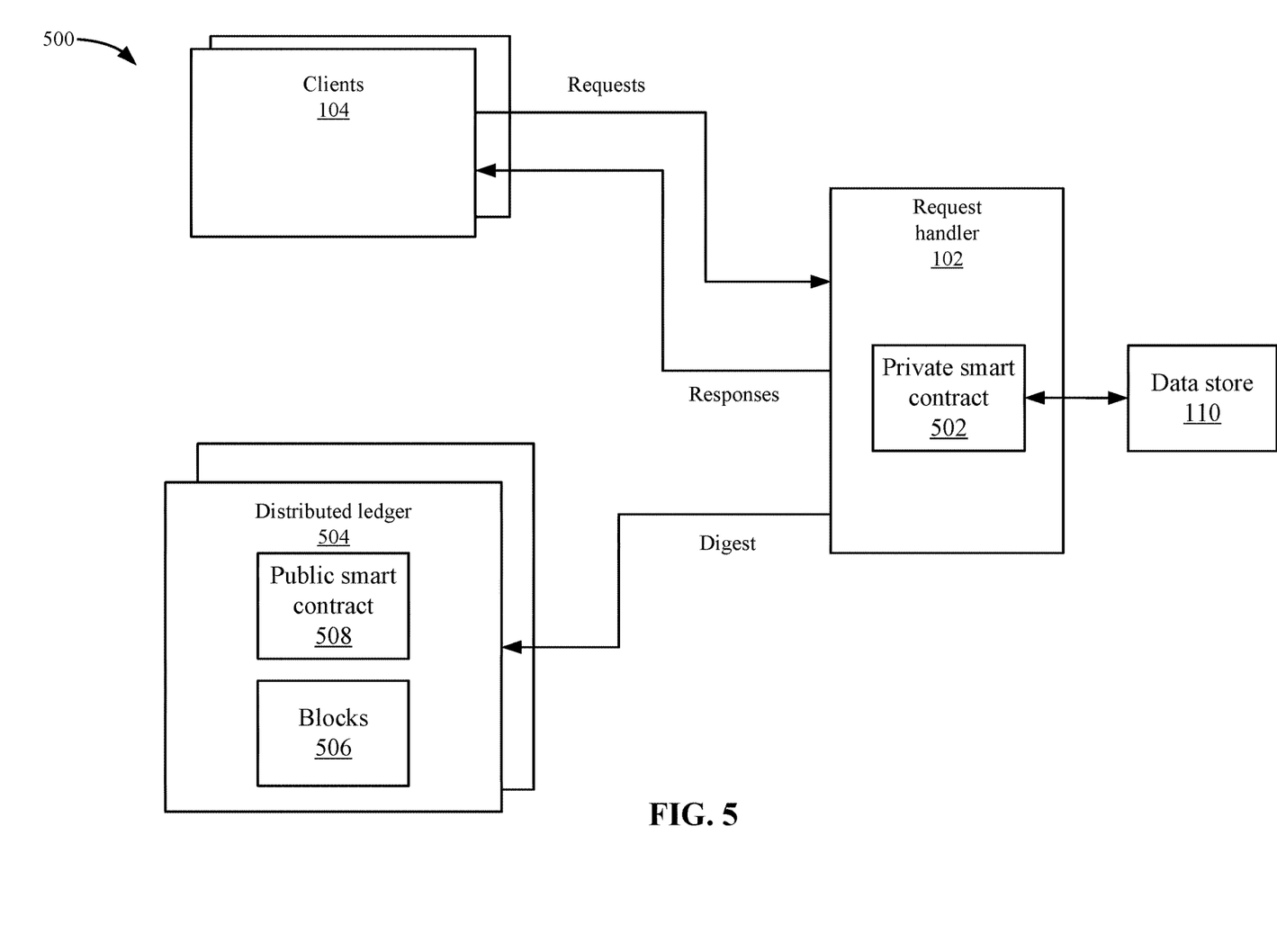
FIG. 5 depicts an application using a distributed ledger according to some embodiments.

FIG. 5 depicts an application using a distributed ledger 504 according to some embodiments. Conventionally, a smart contract is a stateful program running on a blockchain, with two or more mutually-distrusting counter-parties issuing transactions, which results in state transitions. Some embodiments may be used to perform the transactions with the following advantages. The throughput of a smart contract execution is decoupled from the throughput of the underlying blockchain. Specifically, some embodiments use smart contracts leverage untrusted computer processing units (CPUs) executing remotely (e.g., in the cloud) to support larger (e.g., 100×) transaction processing throughput than what is achievable on a public blockchain network that conventionally executed the smart contract. A blockchain simply runs a verifier of the verifiable state machine. The transactions submitted to request handler 102 and the internal state of the contract appear only in encrypted form on the blockchain, thereby preserving the confidentiality of state and transactions. Also, conventional smart contracts support only a sequential model of computation as they must be naively reexecuted by all nodes in the blockchain. However, some embodiments execute transactions concurrently for higher transaction throughput.

In some examples, clients 104 may send requests to request handler 102 and receive responses. Request handler 102 may execute a private smart contract 502 that may process the requests using the state stored in data store 110. Private smart contract 502 may execute logic for performing an operation requested by clients 104. Request handler 102 then provides responses to clients 104. Private smart contract 502 may be private and not known outside of request handler 102, such as by clients 104 or distributed ledger 504. For example, people viewing a distributed ledger 504 may not be able to view the logic of private smart contract 502. In some embodiments, private smart contract 502 may perform operations described with respect to operation processor 108 above.

After performing an operation, request handler 102 sends the digest to distributed ledger 504. Distributed ledger 504 may be a public ledger that records operations in blocks 506. For example, distributed ledger 504 may store information from a digest in a block 506. As multiple operations are performed by request handler 102, distributed ledger 504 may add blocks 506 with the updated information from the digests. For example, information from the operation stored in the digest is stored in blocks 506.

To perform an audit, distributed ledger 504 may use a public smart contract 508, which may perform the operations described with respect to audit processor 112 above. Public smart contract 508 may be public in that other entities can review the logic of public smart contract 508.

The use of private smart contract 502 and public smart contract 508 may improve the operation of a distributed ledger. For example, previously, the smart contract would be stored in the distributed ledger and be accessible to the public. However, using private smart contract 502, the operation may be processed at request handler 102 and the logic remains secret. However, public smart contract 508 may be used to verify the operation of private smart contract 502. The information stored in blocks 506 may also be masked from the state used by private smart contract 502.

In some embodiments, a cloud-hosted service provider (SP) maintains distributed ledger 504 with balances of assets from different clients. An example of assets may include a currency mobile wallet and credits in a ride-sharing application. Clients may submit different types of requests, such as an issue request that increases the value of an asset; a transfer request that moves an asset from one client to another; and a retire request that decreases the balance of an asset. The issue and retire requests may move external assets into and out of distributed ledger 504. In one example, clients may move a currency from a bank account to a mobile wallet. To verify the correct operation of the move, public smart contract 508 may verify the move. However, it is desirable to not allow the verifier to have access to the sensitive details of the client request, such as the amount of money and the state maintained by the service provider. Some embodiments avoid these problems. For example, distributed ledger 504 includes the state and the actions, such as the issue operations, transfer operations, etc., which are transitions on the state. Clients may be identified with public keys and the requests are signed by clients. The service provider shares with each verifier the following for each request: a commitment to the inputs of the request; an ID of the public key of the client issuing the request; a digital signature on the request; (a commitment to) the output state-digest; and a proof of correctness. The commitment may be a masked version of the information. Thus, verifiers do not learn of the content of commitments, but can still check the authenticity of requests using a public key, a signature, and a correct operation of the service provider.

In other applications, in a distributive payment network, banks maintains customer balances, and customers submit requests to move money around their accounts to other accounts (e.g., either in the same bank or in a different bank). This is similar to the cloud based service provider application except that there are multiple banks (service providers) that interact with each other. Deposits, withdrawals, and inter-bank transfers map directly to issue requests, retire requests, and transfer requests from above. For an inter-bank transfer, the sender and the recipient banks coordinate using distributed ledger 504. For example, a sender's bank posts a transaction and the recipient's bank consumes the transaction from distributed ledger 504. Verifiers (e.g., customers, banks, and auditors) can check that the banks are processing the transactions correctly using the verification process described above without writing confidential content for request to distributed ledger 504, such as the destination account, amount, etc.

Another application is a private securities exchange (e.g., dark pool). A securities exchange allows buyers to bid for securities (e.g., stock) sold by sellers. The exchange includes a service provider and clients (e.g., buyers and sellers). The service provider maintains an order book, such as a list of buy and sell orders sorted by price. Clients submit buy or sell orders to the service provider, who either fulfills the order if there is a match, or adds the order to the order book. Although traditional exchanges are public (e.g., clients can see the order book), private exchanges or dark pools are opaque and do not expose the orders.

The exchange may be a state machine where the order book is state and a submit request and withdrawal order are the state transitions. The sorted order book may be represented by the data store. A submit request removes or inserts nodes to the list depending on whether or not there is a match. A withdrawal request removes nodes from the list. Verifiers do not learn anything about the orders beyond the identity of the submitter, but can check for the correct operation.

Hash Function

In some embodiments, a hash function may be used to reduce the amount of data being transmitted and processed. The hash function may be set collision-resistant, meaning that the hash function is computationally infeasible to find two different sets that hash to the same set-digest. For example, a set collision-resistant hash function H takes as input a set of elements and produces a set digest with the property that is difficult to find two different sets that hash to the same value. Second, the hash function is incremental: given a set-digest $d_S$ for a set S, and a set W, verifier 106 can efficiently compute a set-digest for S∪W. Specifically, there is an operation ⊙ (that takes time linear in the number of elements in W) such that:

$$H(S \cup W) = H(S) \odot H(W) = dS \odot H(W)$$

Here, the ⊙ is an operation that takes as input two set digests (e.g., $d_{s1}$ and $d_{s2}$ or $S_1$ and $S_2$) on the underlying sets and outputs a set-digest of $S_1 \cup S_2$. The ⊙ operation may be a modular multiplication. The hash of the sets may be used to reduce the amount of information being processed.

Verifier 106 leverages the hash function to create (and incrementally update) the set digests that represent the read set and the write set, and keeps these digests and the timestamp in a small data structure. The verification may then compare a hash value for the read set and a hash value for the write set. Once again, this comparison is faster than traversing an append only log because the comparison is between the two hash values.

Concurrent Request Execution

The concurrent request execution guarantees sequential consistency: an audit returns true if and only if there exists a serial ordering of all requests such that a sequential execution produces the same responses as what was produced by a concurrent execution (this implies every get operation returns the most recent value written by a prior put operation or insert operation). To achieve this, the concurrent request execution enforces atomicity and support for independent states. In the non-concurrent version, request handler 102 issues two calls to data store 110 for each get and put; they are executed atomically because there is only one outstanding operation. In the concurrent version, request handler 102 explicitly ensure that both calls to data store 110 are executed atomically since it receives and executes many concurrent operations. In the non-concurrent version, verifier 106 maintains a single state object that encodes its key value store operations since initialization. In the concurrent version, each verifier 106 has its own independent state object that contains only the effects of operations issued by that verifier.

Of the four key-value operations, insert is atomic since it performs a single call to data store 110; the audit does not modify state, so it executes atomically using a snapshot. To ensure the atomicity (e.g., both operations occur) of the two calls to data store 110 of the put operation and the get operation in the presence of multiple instances of verifiers, a request handler 102 can keep track of when the first call starts and block any other request that attempts to operate on the same key until the second call (for the same key) completes. One approach to achieve this is for request handler 102 to lock a key during the first call (e.g., a get) and release the lock on the second call (e.g., a put).

Since each verifier 106 issues requests independently, verifier 106 maintains a local state object. This creates two issues. First, the digests and timestamp in the state object of each verifier 106 do not capture the operations issued by other instances of request handlers 102. As a result, some embodiments include a mechanism to combine the state objects of all instances of request handlers 102 prior to invoking the audit—since the audit accepts a single state object. Second, the timestamp field ts is no longer unique for each operation since each verifier 106 initializes its state object with ts=0.

To obtain a single state object, each verifier 106 may collect state objects from every other instance and locally combines all objects. Combining digests is possible because sets are unordered and the union operation is commutative. Moreover, the hash function preserves this property: the operation $\odot$ is commutative. As a result, each verifier 106 constructs set-digests that capture the operations of all instances of verifiers as if they were issued by a single entity. For example, the combined read set is computed as $rs=rs(0) \odot \ldots \odot rs(j)$ (similarly for the write set ws). Finally, the timestamp of the combined state object could be simply 0 or any other value since it is not used in the audit.

There may be, however, one adjustment that may be required to make state digests commutative. The operations get, put, and insert monotonically increase the state using the timestamp. This guarantees that every element added to the state is unique, which ensures sequential consistency (a get always returns the most recent value written by a prior put; else, the probability that a subsequent audit returns true is negligible). The required property of the timestamp field can be preserved while executing requests concurrently by letting the state-digest be $d=(rs, ws)$, and handling the timestamp ts differently.

In the concurrent verification setting, clients 104 submit a batch of requests $(x1, \ldots, x_k)$ at once, and request handler 102 executes those requests concurrently by spawning threads of execution. To support the spawn, request handler augments the computation $\omega_{req}$ so that each new thread is assigned a unique thread-id (e.g., $t_{id}$) and a thread-local timestamp (e.g., ts) that is updated as described above. The combination of the thread id and timestamp acts as a logical clock that replaces the timestamp field used above. In particular, the computation $\Psi_{req}$ initializes the timestamp ts to 0, whereas $t_{id}$ is a program variable that takes a value passed by request handler 102 at runtime (e.g., $t_{id}$ is an auxiliary input, which is an input supplied by request handler 102 rather than the verifier). The computation $\Psi_{req}$ also starts each thread with an empty state-digest (e.g., rs=0, ws=0); when the thread finishes, it returns a state-digest that contains the effect of all state operations that it executed.

For example, the computation $\Psi_{req}$ executes a get operation and then a put operation; the get operation returns a state-digest d' and the put operation returns a state-digest d". At the end of execution, the computation $\Psi_{req}$ returns a digest $d1=d'+d''=(d'\cdot rs \odot d''\cdot rs,\ d'\cdot ws \odot d''\cdot ws)$. Similarly, other threads return a separate state-digest: d2, d3, ... dk. Verifier 106 then computes digest $d_{aggr}=d_1+d_2+\ldots+d_k$, which it passes as an input to audit processor 112. Verifier 106 ensures that each thread is assigned a unique $t_{id}$ by request handler 102, as otherwise request handler 102 could violate sequential consistency by returning a stale value for the get operations. Also, verifier 106 verifies each get and put request contains two calls and a timestamp update and a correct operation ensure this happens atomically to guarantee a consistent storage abstraction.

To guarantee that thread ids are unique, the computation $\Psi_{req}$ includes the value assigned to the thread id $t_{id}$ variable in the output of the computation ($y_i$), so verifier 106 can check their uniqueness. To ensure atomicity of get and put requests, when there is a single writer, there are no overlapping calls to data store 110 so the operations are atomic. To support multiple writers, request handler 102 may set a special locked bit with the key during the first call, and clears the locked bit after the second call. The locked bit is a mechanism to provide atomicity to get and put operations and blocks all calls on a given key if the locked bit for that key is set. Request handler 102 could misbehave and choose not to follow that mechanism, it violates linearizability. Consequently, the probability that a subsequent audit passes is small.

The use of commitments may change the concurrent processing design described above. For each thread spawned by request handler 102, a verifier 106 receives a commitment to a state-digest rather than the state-digest itself (since digests do not preserve privacy). This means that the operator "+" may not be computed by verifier 106, since it does not work over commitments. To address this, request handler 102 supports a computation $\Psi_{aggr}$ that takes as input commitments to digests, and outputs a commitment to the aggregated digest (which is later passed as input to audit processor 112) along with a proof of correct aggregation.

CONCLUSION

Accordingly, some embodiments provide a verifiable state machine that simplifies the auditing of the operations of the verifiable state machine. The use of the sets reduces the amount of computations that are needed, simplifies the verification, and also increases the speed of determining whether the operations are valid.

Further, the use of a distributed ledger allows smart contracts that perform the operations to be private. The public smart contract performs the auditing and additionally, the information used to calculate the operations may also be kept secret. Accordingly, the distributed ledger may include information that can verify that the operations performed were correct, but may not include sensitive information.

Example Computer System

Figure 6:
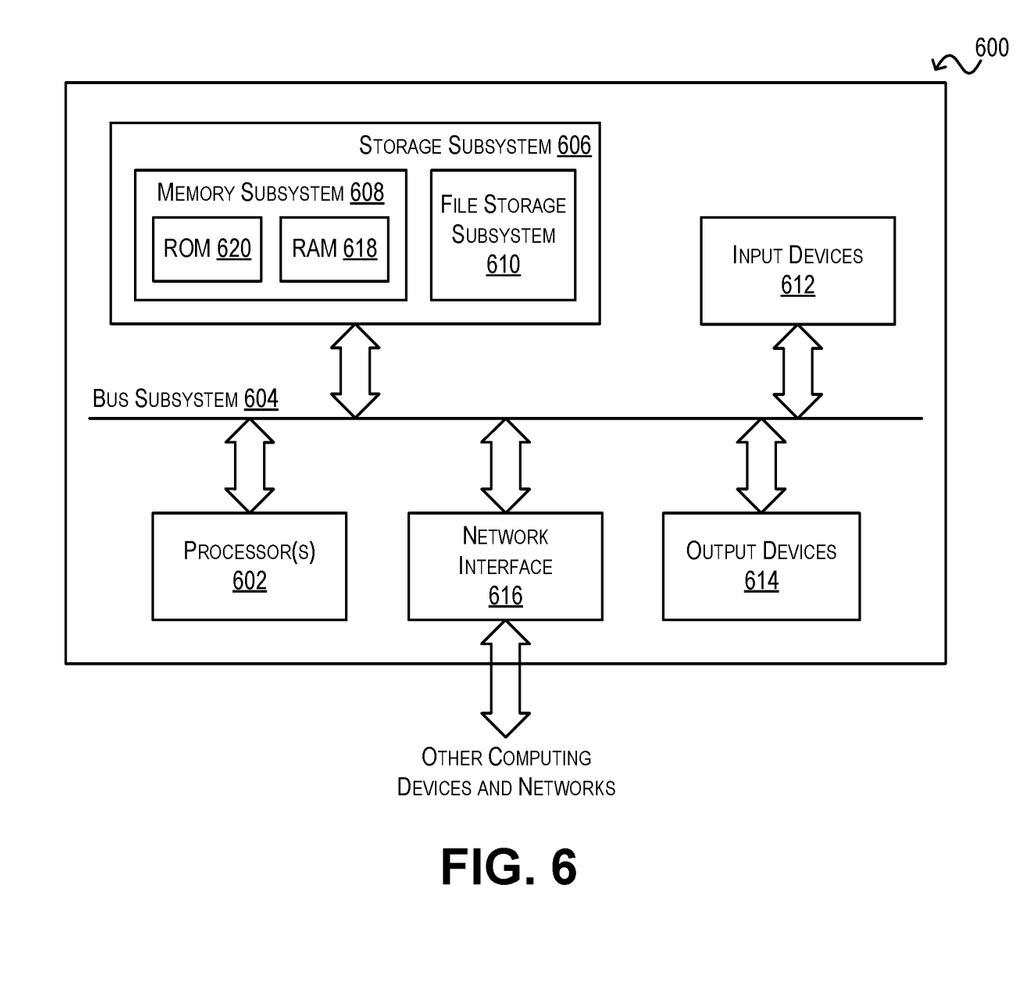
FIG. 6 depicts a simplified block diagram of an example computer system according to certain embodiments.

FIG. 6 depicts a simplified block diagram of an example computer system 600 according to certain embodiments. Computer system 600 can be used to implement any of the computing devices, systems, or servers described in the foregoing disclosure. As shown in FIG. 6, computer system 600 includes one or more processors 602 that communicate with a number of peripheral devices via a bus subsystem 604. These peripheral devices include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Storage subsystem 606 includes a memory subsystem 608 and a file/disk storage subsystem 610. Subsystems 608 and 610 represent non-transitory computer-readable storage media that can store program code and/or data that provide the functionality of embodiments of the present disclosure.

Memory subsystem 608 includes a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
receive one or more digests at a service configured to verify a plurality of requests that were performed by a request handler for one or more clients, the one or more digests summarizing processing of the plurality of requests using a first contract, wherein logic for the first contract is a private contract to the request handler and the logic is executed to perform an operation for the plurality of requests, and wherein the logic is not viewable to the one or more clients or the service;
store information for the one or more digests in a plurality of blocks in a distributed ledger, wherein the information masks a detail of the processing of the plurality of requests;
execute a second contract to verify the processing of the plurality of requests, wherein the second contract:
generates a first set of first masked information of states for reads of values from a data store;
generates a second set of second masked information of states for values written to the data store; and
verifies the processing by checking states in the first set are a subset of states in the second set using the first masked information and the second masked information without learning of the detail of the processing the states for reads of values and the states for values written, wherein logic for the second contract is a public contact and is accessible to entities outside of the service that performs the verifying.

2. The computer system of claim 1, wherein processing the plurality of requests comprises:
retrieving a first value for a key from a key value data store for a first request;
processing the first value using the first contract; and
storing a second value for the key in the key value store, the second value based on the processing of the first value for the first request.

3. The computer system of claim 2, wherein the one or more digests comprise information for the processing of the plurality of requests that masks the first value and the second value from the service performing the verifying.

4. The computer system of claim 2, wherein the information stored on the distributed ledger masks the first value and the second value.

5. The computer system of claim 2, wherein:
the write set comprises information for a first write set including the key, the first value, and a first timestamp,
the read set comprises information for a first read set including the key, the first value, and the first timestamp, and
the write set includes a second write set including the key, the second value, and a second timestamp.

6. The computer system of claim 5, wherein processing the plurality of requests comprises:
retrieving the second value for the key from the key value data store for a second request;
processing the second value using the first contract; and
storing a third value for the key in the key value store, the third value based on the processing of the second value.

7. The computer system of claim 6, wherein:
the read set comprises information for the first read set including the key, the first value, and the first timestamp and a second read set including the key, the second value, and the second timestamp, and
the write set comprises information for the first write set including the key, the first value, and the first timestamp, the second write set including the key, the second value, and the second timestamp, and a third write set including the key, the third value, and a third timestamp.

8. The computer system of claim 7, wherein verifying the processing comprises:
verifying states in the first read set and the second read set are found in the write set using the first masked information and the second masked information.

9. The computer system of claim 8, wherein the second value in the second read set is the same as the second value in the second write set when the processing is verified as valid.

10. The computer system of claim 8, wherein the second value in the second read set is not the same as the second value in the second write set when the processing is verified as not valid.

11. The computer system of claim 8, wherein first read set and the second read set are included in the write set without the read set including any other read sets not found in the write set when the processing is verified as valid.

12. The computer system of claim 8, wherein at least one of the first read set and the second read set are not included in the write set when the processing is verified as valid.

13. The computer system of claim 1, wherein the one or more digests each comprise information for an input to the first contract, an output to the first contract, and a proof that describes how the output was generated from the input.

14. The computer system of claim 1, wherein the plurality of requests are executed concurrently by a plurality of request handlers.

15. The computer system of claim 14, wherein the plurality of requests are identified by a timestamp and an identifier by a request handler.

16. The computer system of claim 14, wherein the information in the one or more digests is hashed, wherein:
the first set stores hashed states for reads of values from the data store;
the second set that stores hashed states for values written to the data store; and
the processing is verified by checking that the hashed states in the first set are the subset of the hashed states in the second set.

17. A method comprising:
receiving, by a computing device, one or more digests at a service configured to verify a plurality of requests that were performed by a request handler for one or more clients, the one or more digests summarizing processing of the plurality of requests using a first contract, wherein logic for the first contract is a private contract to the request handler and the logic is executed to perform an operation for the plurality of requests, and wherein the logic is not viewable to the one or more clients or the service;
storing, by the computing device, information for the one or more digests in a plurality of blocks in a distributed ledger, wherein the information masks a detail of the processing of the plurality of requests;
executing, by the computing device, a second contract to verify the processing of the plurality of requests, wherein the second contract:
generates, by the computing device, a first set of first masked information of states for reads of values from a data store;
generates, by the computing device, a second set of second masked information of states for values written to the data store; and
verifies, by the computing device, the processing by checking states in the first set are a subset of states in the second set using the first masked information and the second masked information without learning of the detail of the processing the states for reads of values and the states for values written, wherein logic for the second contract is a public contact and is accessible to entities outside of the service that performs the verifying.

18. A non-transitory computer readable storage medium having stored thereon program code executable by a computer system, the program code causing the computer system to:
receive one or more digests at a service configured to verify a plurality of requests that were performed by a request handler for one or more clients, the one or more digests summarizing processing of the plurality of requests using a first contract, wherein logic for the first contract is a private contract to the request handler and the logic is executed to perform an operation for the plurality of requests, and wherein the logic is not viewable to the one or more clients or the service;
store information for the one or more digests in a plurality of blocks in a distributed ledger, wherein the information masks a detail of the processing of the plurality of requests;
execute a second contract to verify the processing of the plurality of requests, wherein the second contract:
generates a first set of first masked information of states for reads of values from a data store;
generates a second set of second masked information of states for values written to the data store; and
verifies the processing by checking states in the first set are a subset of states in the second set using the first masked information and the second masked information without learning of the detail of the processing the states for reads of values and the states for values written, wherein logic for the second contract is a public contact and is accessible to entities outside of the service that performs the verifying.

19. The method of claim 17, wherein processing the plurality of requests comprises:
retrieving a first value for a key from a key value data store for a first request;
processing the first value using the first contract; and
storing a second value for the key in the key value store, the second value based on the processing of the first value for the first request.

20. The method of claim 17, wherein the one or more digests each comprise information for an input to the first contract, an output to the first contract, and a proof that describes how the output was generated from the input.

* * * * *